US009665616B2

United States Patent
Pickersgill et al.

(10) Patent No.: US 9,665,616 B2
(45) Date of Patent: May 30, 2017

(54) METHOD AND SYSTEM FOR PROVIDING MEDIA RECOMMENDATIONS

(75) Inventors: Jason Douglas Pickersgill, Los Angeles, CA (US); Mark Leroy Walker, Castaic, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 162 days.

(21) Appl. No.: 13/994,914

(22) PCT Filed: Dec. 22, 2011

(86) PCT No.: PCT/US2011/066721
§ 371 (c)(1),
(2), (4) Date: Jun. 17, 2013

(87) PCT Pub. No.: WO2012/088374
PCT Pub. Date: Jun. 28, 2012

(65) Prior Publication Data
US 2013/0268557 A1   Oct. 10, 2013

Related U.S. Application Data
(60) Provisional application No. 61/459,970, filed on Dec. 22, 2010.

(51) Int. Cl.
*G06F 17/30* (2006.01)
*H04N 21/422* (2011.01)
*H04N 21/482* (2011.01)

(52) U.S. Cl.
CPC .. *G06F 17/30424* (2013.01); *G06F 17/30058* (2013.01); *H04N 21/422* (2013.01); *H04N 21/4826* (2013.01)

(58) Field of Classification Search
None
See application file for complete search history.

(56) References Cited

U.S. PATENT DOCUMENTS

| 6,018,738 A | 1/2000 | Breese et al. |
| 7,454,775 B1 | 11/2008 | Schaffer et al. |

(Continued)

FOREIGN PATENT DOCUMENTS

| CN | 101430631 | 5/2009 |
| EP | 2252050 | 11/2010 |

(Continued)

OTHER PUBLICATIONS

Screenshot from www.netflix.com on Aug. 23, 2011.
International Search report dated Jun. 28, 2012.

*Primary Examiner* — James Trujillo
*Assistant Examiner* — Giuseppi Giuliani
(74) *Attorney, Agent, or Firm* — Brian J. Dorini; Michael A. Pugel; Ivonete Markman

(57) ABSTRACT

A system, method and user interface for providing media or content recommendations are provided. More specifically, the system, method and user interface provide media recommendations including enabling a user to select a first media object, the first media object having a first set of characteristics, enabling the user to select a second media object, the second media object having a second set of characteristics, and recommending a plurality of additional media objects, each of the plurality of additional media objects having at least one characteristic in common with the first set of characteristics and at least one characteristic in common with the second set of characteristics.

21 Claims, 18 Drawing Sheets

(56) References Cited

U.S. PATENT DOCUMENTS

| | | |
|---|---|---|
| 8,046,705 B2 | 10/2011 | Hunleth et al. |
| 2002/0078029 A1* | 6/2002 | Pachet .............. G06F 17/30017 |
| 2003/0221541 A1* | 12/2003 | Platt ................................ 84/609 |
| 2006/0242190 A1* | 10/2006 | Wnek ........................... 707/102 |
| 2007/0261070 A1 | 11/2007 | Brown et al. |
| 2008/0086456 A1 | 4/2008 | Rasanen et al. |
| 2008/0250312 A1* | 10/2008 | Curtis ........................... 715/700 |
| 2009/0064229 A1 | 3/2009 | Morris |
| 2009/0138505 A1* | 5/2009 | Purdy ........................ 707/104.1 |
| 2009/0254548 A1 | 10/2009 | Nagano et al. |
| 2009/0281906 A1 | 11/2009 | Cai et al. |
| 2010/0058388 A1 | 3/2010 | Baba et al. |
| 2010/0251304 A1 | 9/2010 | Donoghue et al. |
| 2011/0283236 A1* | 11/2011 | Beaumier ............. G07F 11/002 715/835 |
| 2012/0036139 A1 | 2/2012 | Okamoto et al. |

FOREIGN PATENT DOCUMENTS

| | | |
|---|---|---|
| JP | 2007199777 | 8/2007 |
| JP | 2009252010 | 10/2009 |
| JP | 2010231271 | 10/2010 |
| KR | 2010114982 | 10/2010 |
| WO | WO2004034703 | 4/2004 |
| WO | WO2005022891 | 3/2005 |
| WO | WO2010113619 | 10/2010 |

* cited by examiner

METHOD AND SYSTEM FOR PROVIDING MEDIA RECOMMENDATIONS

REFERENCE TO RELATED PROVISIONAL APPLICATION

This application claims the benefit, under 35 U.S.C. §365 of International Application PCT/US2011/066721, filed Dec. 22, 2011, which was published in accordance with PCT Article 21(2) on Jun. 28, 2012 in English and which claims the benefit of United States provisional patent application No. 61/459,970, filed Dec. 22, 2010.

TECHNICAL FIELD OF THE INVENTION

The present disclosure generally relates to digital content systems and methods for searching through a large amount of media content efficiently and in a graphical way, and more particularly, to a system, method and graphic user interface for providing media recommendations.

BACKGROUND OF THE INVENTION

Home entertainment systems, including television and media centers, are converging with the Internet and providing access to a large number of available sources of content, such as video, movies, TV programs, music, etc. This expansion in the number of available sources necessitates a new strategy for navigating a media interface associated with such systems and making content recommendations and selections.

The large number of possible content sources creates an interface challenge that has not yet been successfully solved in the field of home media entertainment. This challenge involves successfully presenting users with a large number of elements (programs, sources, etc.) without the need to tediously navigate through multiple display pages or hierarchies of content.

Further, most existing search paradigms make an assumption that the user knows what they are looking for when they start, whereas often, a mechanism to allow a process of discovery and cross linkage is more desirable or appropriate.

One approach for allowing a process of discovery and cross linkage is the use of ratings. Under this approach a user rates content and a recommendation engine recommends additional content related to the rated content. For example, if a user gives an action movie a five star rating and a horror movie a one star rating, a conventional recommendation engine is likely to recommend other action movies to the user rather than other horror movies. A drawback to this approach is that recommendations tend to be skewed to particular movie genres until a large enough rating database is created over multiple movie genres (e.g., action, horror, romance, etc.) by the user. As should be appreciated, the creation of such a rating database has the drawback of being time consuming. Furthermore, another drawback is that even if a large rating database is created by a user, there still may be inaccurate or non-relevant recommendations since the rating information may have been inaccurately collected from the user. For example, if a user rates the first five horror movies presented for rating as one star movie, the conventional recommendation engine may stop recommending horror movies to the user. However, the user may just not have liked the first five horror movies presented and may actually desire to have other horror movies brought to his or her attention.

Another approach for allowing a process of discovery and cross linkage is the tracking a user's viewing/purchasing habits over a period of time. However, similar to the creation of a rating database, tracking user's viewing/purchasing habits over a long enough time period to generate relevant recommendations also has the drawback of being time consuming.

The present disclosure is directed towards overcoming these drawbacks.

SUMMARY

A system, method and user interface for providing media or content recommendations are provided. The present disclosure is directed towards a system, method and user interface for providing media recommendations including enabling a user to select a first media object, the first media object having a first set of characteristics, enabling the user to select a second media object, the second media object having a second set of characteristics, and recommending a plurality of additional media objects, each of the plurality of additional media objects having at least one characteristic in common with the first set of characteristics and at least one characteristic in common with the second set of characteristics. The present disclosure is also directed towards a system, method and user interface for providing media recommendations including enabling a user to select a first media object, the first media object having a first set of characteristics, recommending a first plurality of media objects, each of the first plurality of media objects having at least one characteristic in common with the first set of characteristics, enabling the user to select a second media object from the first plurality of recommended media objects, the second media object having a second set of characteristics, and recommending a second plurality of media objects, each of the second plurality of media objects having at least one characteristic in common with the first set of characteristics and at least one characteristic in common with the second set of characteristics.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
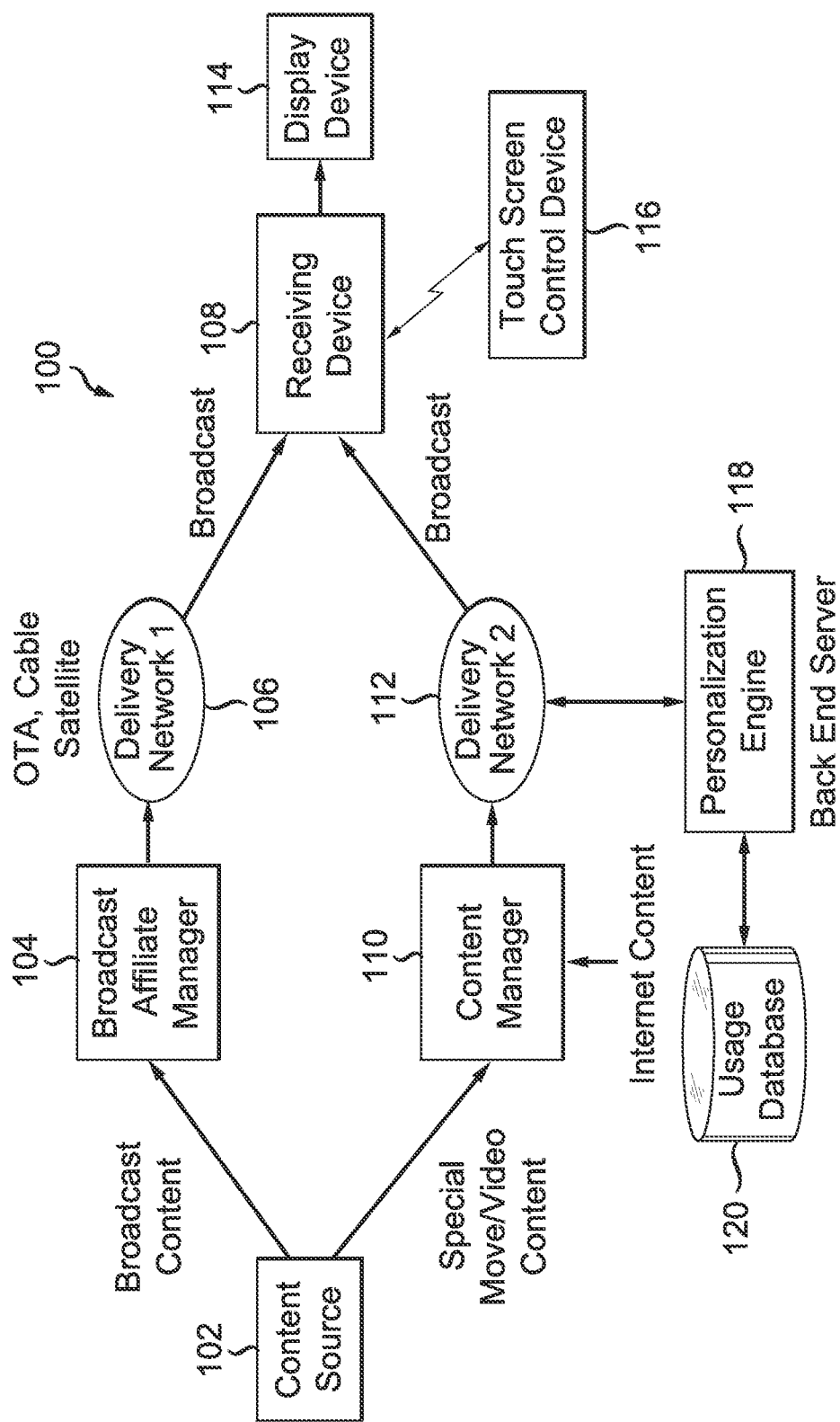
FIG. 1 is a block diagram of an exemplary system for delivering video content in accordance with the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The proposed disclosure is directed towards a method and system for enabling a user to obtain dynamic and adjustable recommendations based on a personal preference toward one particular piece of media by moving to a smart shelf. The system and method of the present disclosure allows for an immediate response giving an alternative to capturing data over time and learning user patterns.

Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a receiving device 108 in a user's home, where the content will subsequently be searched by the user. It is to be appreciated that the receiving device 108 can take many forms and may be embodied as a set top box/digital video recorder (DVR), a gateway, a modem, etc. Further, the receiving device 108 may act as entry point, or gateway, for a home network system that includes additional devices configured as either client or peer devices in the home network.

A second form of content is referred to as special content. Special content may include content delivered as premium viewing, pay-per-view, or other content otherwise not provided to the broadcast affiliate manager, e.g., movies, video games or other video elements. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's receiving device 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106). In addition, the user may also obtain content directly from the Internet via delivery network 2 (112) without necessarily having the content managed by the content manager 110.

Several adaptations for utilizing the separately delivered content may be possible. In one possible approach, the special content is provided as an augmentation to the broadcast content, providing alternative displays, purchase and merchandising options, enhancement material, etc. In another embodiment, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

The receiving device 108 may receive different types of content from one or both of delivery network 1 and delivery network 2. The receiving device 108 processes the content, and provides a separation of the content based on user preferences and commands. The receiving device 108 may also include a storage device, such as a hard drive or optical disk drive, for recording and playing back audio and video content. Further details of the operation of the receiving device 108 and features associated with playing back stored content will be described below in relation to FIG. 2. The processed content is provided to a display device 114. The display device 114 may be a conventional 2-D type display or may alternatively be an advanced 3-D display.

The receiving device 108 may also be interfaced to a second screen such as a touch screen control device 116. The touch screen control device 116 may be adapted to provide user control for the receiving device 108 and/or the display device 114. The touch screen device 116 may also be capable of displaying video content. The video content may be graphics entries, such as user interface entries (as discussed below), or may be a portion of the video content that is delivered to the display device 114. The touch screen control device 116 may interface to receiving device 108 using any well known signal transmission system, such as infra-red (IR) or radio frequency (RF) communications and may include standard protocols such as infra-red data association (IRDA) standard, Wi-Fi, Bluetooth and the like, or any other proprietary protocols. Operations of touch screen control device 116 will be described in further detail below.

In the example of FIG. 1, the system 100 also includes a back end server 118 and a usage database 120. The back end server 118 includes a personalization engine that analyzes the usage habits of a user and makes recommendations based on those usage habits. The usage database 120 is where the usage habits for a user are stored. In some cases, the usage database 120 may be part of the back end server 118. In the present example, the back end server 118 (as well as the usage database 120) is connected to the system 100 and accessed through the delivery network 2 (112).

Figure 2:
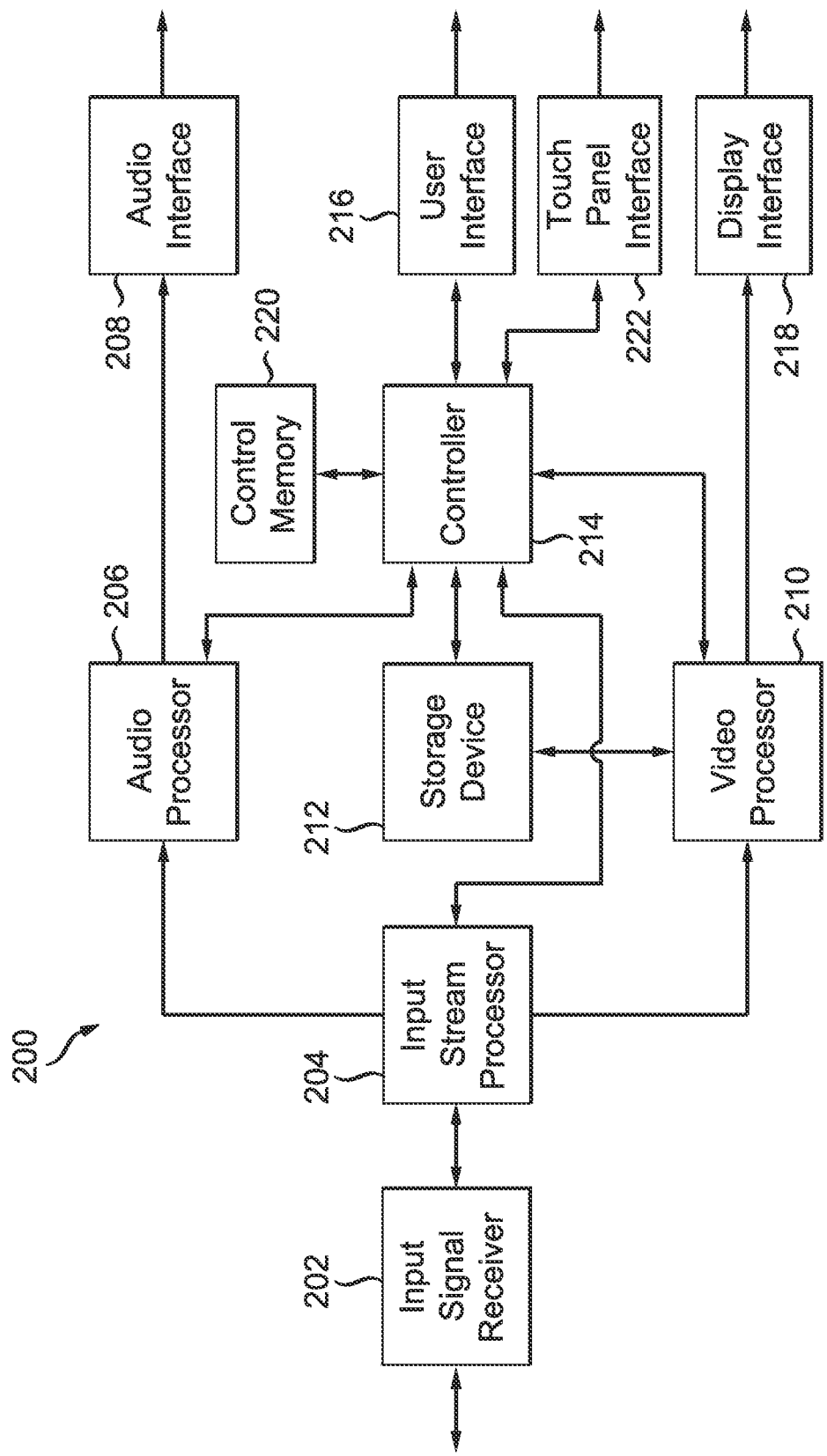
FIG. 2 is a block diagram of an exemplary set-top box/digital video recorder (DVR) in accordance with the present disclosure.

Turning now to FIG. 2, a block diagram of an embodiment of a receiving device 200 is shown. Receiving device 200 may operate similar to the receiving device described in FIG. 1 and may be included as part of a gateway device, modem, set-top box, or other similar communications device. The device 200 shown may also be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved by the input signal receiver 202 based on user input provided through a control interface or touch panel interface 222. Touch panel interface 222 may include an interface for a touch screen device. Touch panel interface 222 may also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 may provide a digital signal to an audio output device or display device using a High-Definition Multimedia Interface (HDMI) cable or alternate audio interface such as via a Sony/Philips Digital Interconnect Format (SPDIF). The audio interface may also include amplifiers for driving one more sets of speakers. The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 may be a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as HDMI. It is to be appreciated that the display interface 218 will generate the various screens for presenting the search results (e.g., in a three dimensional gird, two dimensional array, and/or a shelf as will be described in more detail below).

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content and the creation and adjusting of the grid, array and/or shelf display representing the content, either stored or to be delivered via the delivery networks, described above.

The controller 214 is further coupled to control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 may store instructions for controller 214. Control memory may also store a database of elements, such as graphic elements containing content. The database may be stored as a pattern of graphic elements, such as graphic elements containing content, various graphic elements used for generating a displayable user interface for display interface 218, and the like. Alternatively, the memory may store the graphic elements in identified or grouped memory locations and use an access or location table to identify the memory locations for the various portions of information related to the graphic elements. Additional details related to the storage of the graphic elements will be described below. Further, the implementation of the control memory 220 may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

Figure 3:
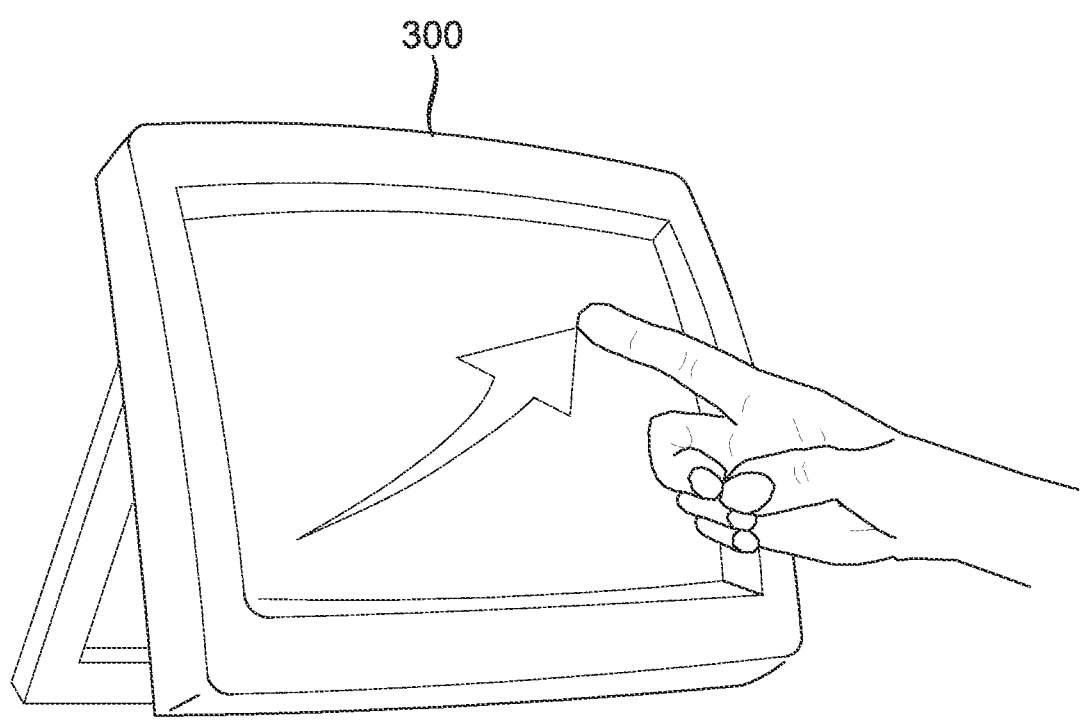
FIG. 3 is a perspective view of an exemplary remote controller, tablet and/or second screen device in accordance with an embodiment of the present disclosure.

Turning now to FIG. 3, the user interface process of the present disclosure employs an input device that can be used to express functions, such as fast forward, rewind, etc. To allow for this, a tablet or touch panel device 300 (which is the same as the touch screen device 116 shown in FIG. 1 and/or is an integrated example of media device 108 and touch screen device 116) may be interfaced via the user interface 216 and/or touch panel interface 222 of the receiving device 200. The touch panel device 300 allows operation of the receiving device or set top box based on hand movements, or gestures, and actions translated through the panel into commands for the set top box or other control device. In one embodiment, the touch panel 300 may simply serve as a navigational tool to navigate the grid display. In other embodiments, the touch panel 300 will additionally serve as the display device allowing the user to more directly interact with the navigation through the grid display of content. The touch panel device may be included as part of a remote control device containing more conventional control functions such as activator and/or actuator buttons. The touch panel 300 can also includes at least one camera element. As described below, the touch panel device 300 (or display device 114) may utilize a smart shelf function to provide media recommendations to a user.

Optionally, controller 214 can be adapted to extract metadata, criteria, characteristics or the like from audio and video media by using audio processor 206 and video processor 210, respectively. That is, metadata, criteria, characteristics or the like that is contained in video signal in the vertical blanking interval, auxiliary data fields associated with video, or in other areas in the video signal can be harvested by using the video processor 210 with controller 214 as to generate metadata that can be used for functions such as generating an electronic program guide, have descriptive information about received video, supporting an auxiliary information service, and the like. Similarly, the audio processor 206 working with controller 214 can be adapted to recognize audio watermarks that may be in an audio signal. Such audio watermarks can then be used to perform some action such as the recognition of the audio signal, security which identifies the source of an audio signal, or perform some other service. Furthermore, metadata, criteria, characteristics or the like, to support the actions listed above can come from a network source which are processed by controller 214.

Figure 4:
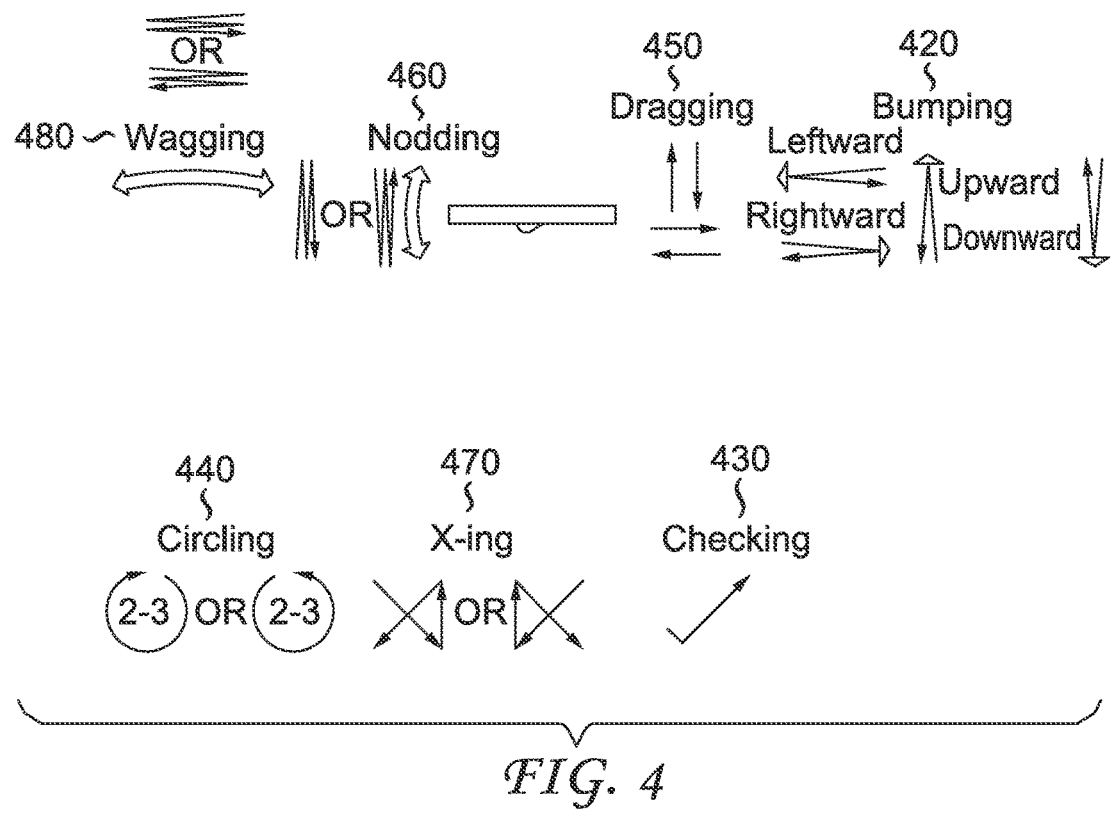
FIG. 4 illustrates a number of gestures in accordance with an embodiment of the present disclosure.

Turning now to FIG. 4, the use of a gesture sensing controller or touch screen, such as shown, provides for a number of types of user interaction. The inputs from the controller are used to define gestures and the gestures, in turn, define specific contextual commands. The configuration of the sensors may permit defining movement of a user's fingers on a touch screen or may even permit defining the movement of the controller itself in either one dimension or two dimensions. Two-dimensional motion, such as a diagonal, and a combination of yaw, pitch and roll can be used to define any three-dimensional motion, such as a swing. A number of gestures are illustrated in FIG. 4. Gestures are interpreted in context and are identified by defined movements made by the user.

Bumping 420 is defined by a two-stroke drawing indicating pointing in one direction, either up, down, left or right. The bumping gesture is associated with specific commands in context. For example, in a TimeShifting mode, a left-bump gesture 420 indicates rewinding, and a right-bump gesture indicates fast-forwarding. In other contexts, a bump gesture 420 is interpreted to increment a particular value in the direction designated by the bump. Checking 440 is defined as in drawing a checkmark. It is similar to a downward bump gesture 420. Checking is identified in context to designate a reminder, user tag or to select an item or element. Circling 440 is defined as drawing a circle in either direction. It is possible that both directions could be distinguished. However, to avoid confusion, a circle is identified as a single command regardless of direction. Dragging 450 is defined as an angular movement of the controller (a change in pitch and/or yaw) while pressing a button (virtual or physical) on the tablet 300 (i.e., a "trigger drag"). The dragging gesture 450 may be used for navigation, speed, distance, time-shifting, rewinding, and forwarding. Dragging 450 can be used to move a cursor, a virtual cursor, or a change of state, such as highlighting outlining or selecting on the display. Dragging 450 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 460 is defined by two fast trigger-drag up-and-down vertical movements. Nodding 460 is used to indicate "Yes" or "Accept." X-ing 470 is defined as in drawing the letter "X." X-ing 470 is used for "Delete" or "Block" commands. Wagging 480 is defined by two trigger-drag fast back-and-forth horizontal movements. The wagging gesture 480 may used to indicate "No" or "Cancel" or to move displayed or virtual objects (e.g. cursors) horizontally.

Depending on the complexity of the sensor system, only simple one dimensional motions or gestures may be allowed. For instance, a simple right or left movement on the sensor as shown here may produce a fast forward or rewind function. In addition, multiple sensors could be included and placed at different locations on the touch screen. For instance, a horizontal sensor for left and right movement may be placed in one spot and used for volume up/down, while a vertical sensor for up and down movement may be place in a different spot and used for channel up/down. In this way specific gesture mappings may be used. The user may interact with the smart shelf page, described below, using gestures performed on the tablet 300.

Figure 5:
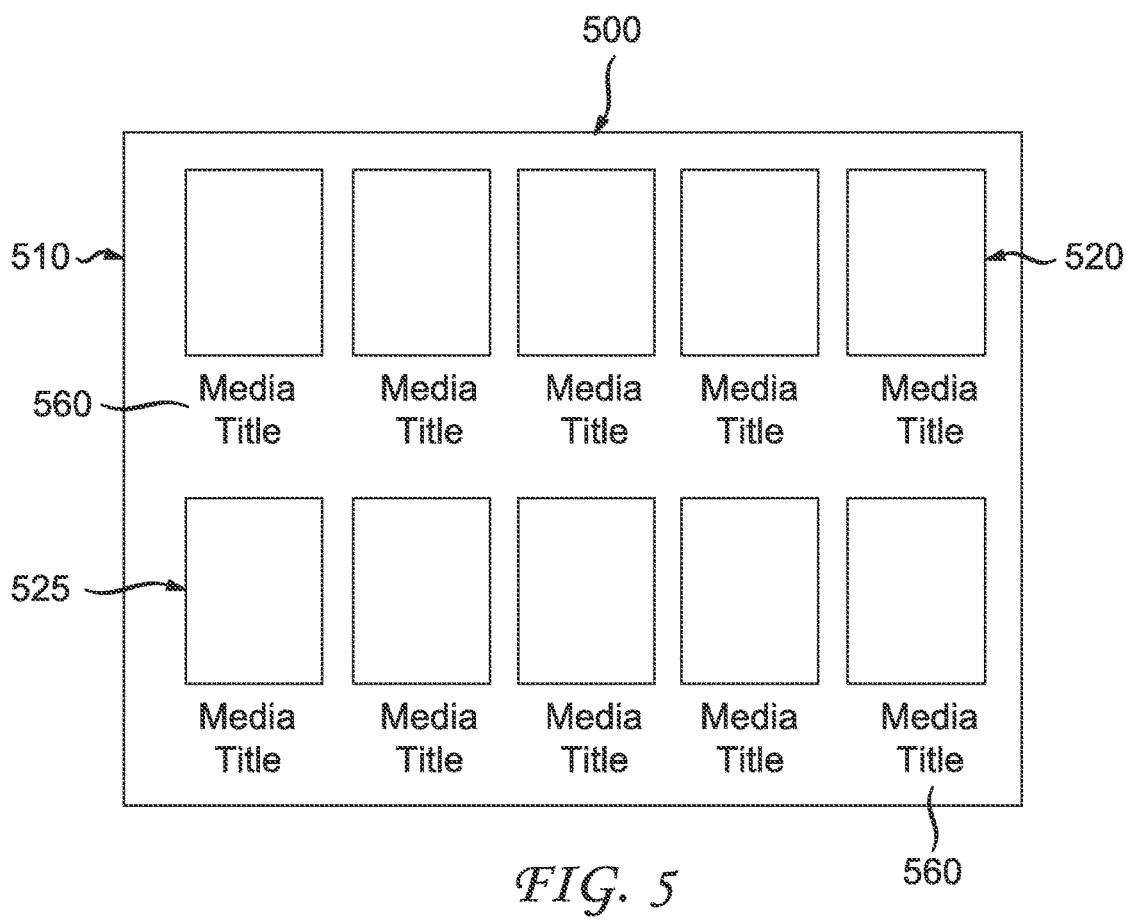
FIG. 5 illustrates an exemplary embodiment of a user interface of the present disclosure.

Referring now to FIG. 5, an exemplary embodiment of a user interface 500 showing a collection of media assets, elements or thumbnails in accordance with the present disclosure is shown. Specifically, display area 510 shows a collection of media assets that are represented by different graphics/icons. These media assets such as 520 and 525 can be selected for playback by using a gesture/control interface command, whereby a media device (e.g., media device 108, display device 114 and/or touch panel device 300) will playback a selected media asset by retrieving such an asset from a storage medium, requesting the asset from a server, activating an attached playback device, and the like. In particular, media assets 520 and 525 are identified by their media title (e.g., movie title, album title, TV episode title, etc.) as shown by labels 560. The media assets can also be selected by a user and moved into a shelf on a smart shelf page such that media recommendations (e.g., movie recommendations) can be provided to the user, as discussed in further detail below.

Figure 6:
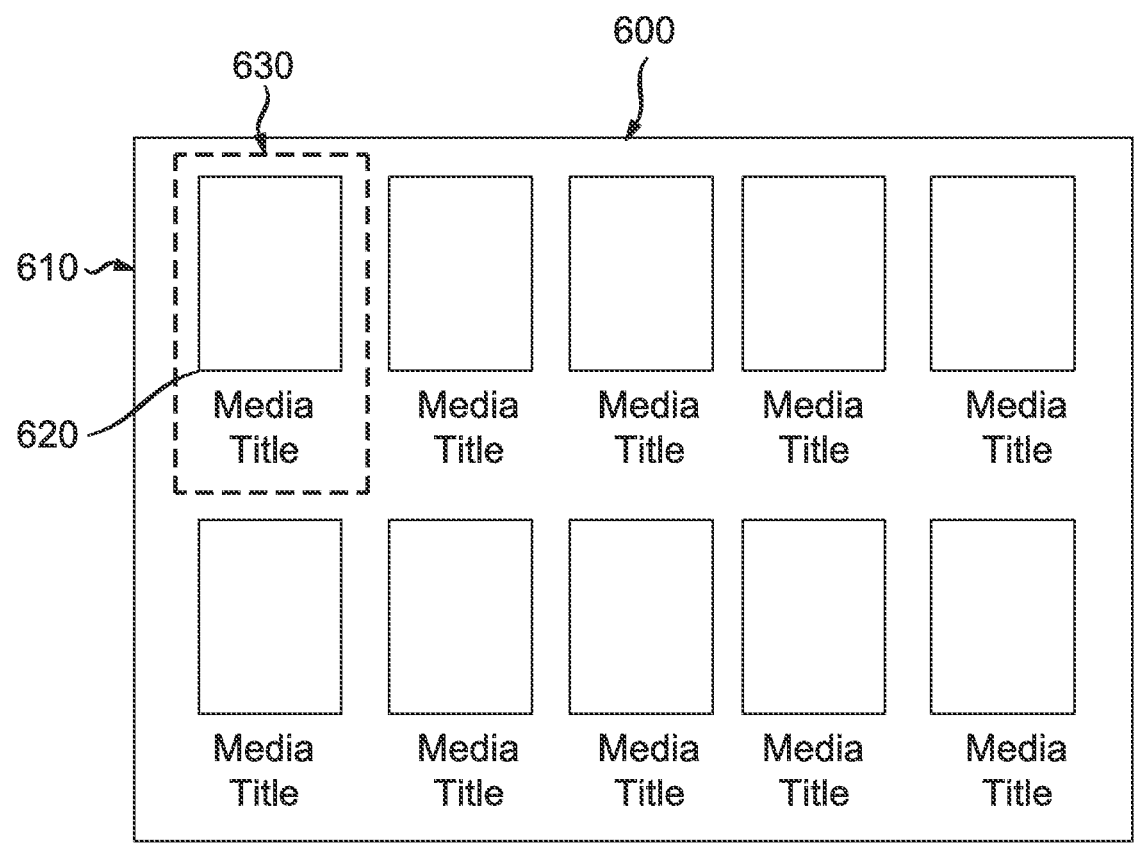
FIG. 6 illustrates an exemplary embodiment of a user interface of the present disclosure.

Referring now to FIG. 6, an exemplary embodiment of a user interface 600 illustrating the selection of a media asset is shown. More specifically, display area 610 shows the collection of media assets that are represented by different graphics/icons. The user can highlight or select 630 a media asset 620 to obtain details about the selected media asset 620. The selection or highlighting can be made using a mouse, keyboard or remote control. Alternatively the selection or highlighting can be made via a gesture, as discussed above.

Figure 7:
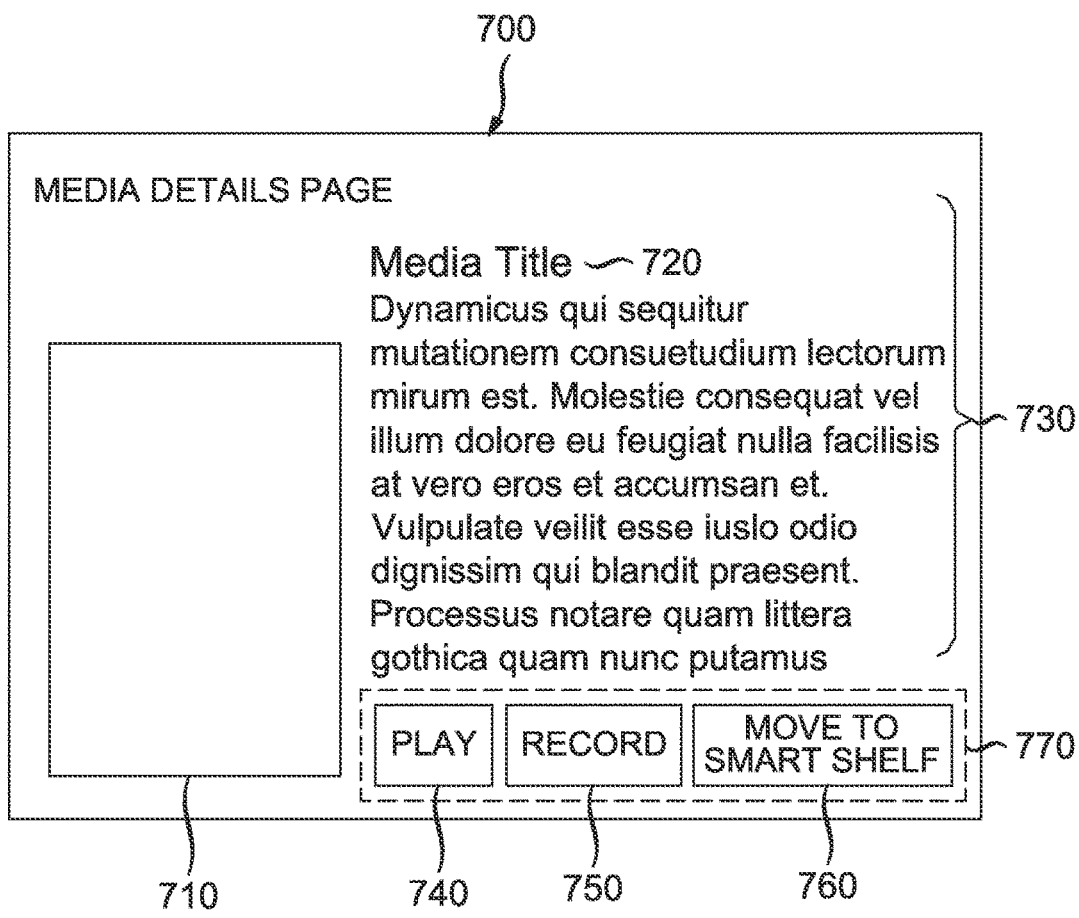
FIG. 7 illustrates an exemplary embodiment of a user interface of the present disclosure.

As shown in FIG. 7, once the media asset is selected, a media details page 700 may be displayed to a user. The media details page 700 may show an icon or thumbnail 710 representing the media asset, the media title 720, a brief summary 730 describing the media asset, a play button 740 allowing the user to playback the media asset, a record button 750 allowing the user to record the media asset on a storage medium (e.g., in storage device 212 and/or a memory integrated into display device 114 and/or touch screen devices 116, 300) or remotely accessed through, for example, deliver network 1 (106) or delivery network 2 (112). In accordance with the present disclosure the media details page 700 may also contain a "Move To Smart Shelf" button 760 that when selected or highlighted 770, allows the user to move the media asset into a shelf in a smart shelf page such that media recommendations (e.g., movie recommendations) can be provided to the user, as discussed in further detail below. The selection or highlighting of the "Move To Smart Shelf" button can be made using a mouse, keyboard or remote control. Alternatively the selection or highlighting can be made via a gesture, as discussed above.

Figure 8:
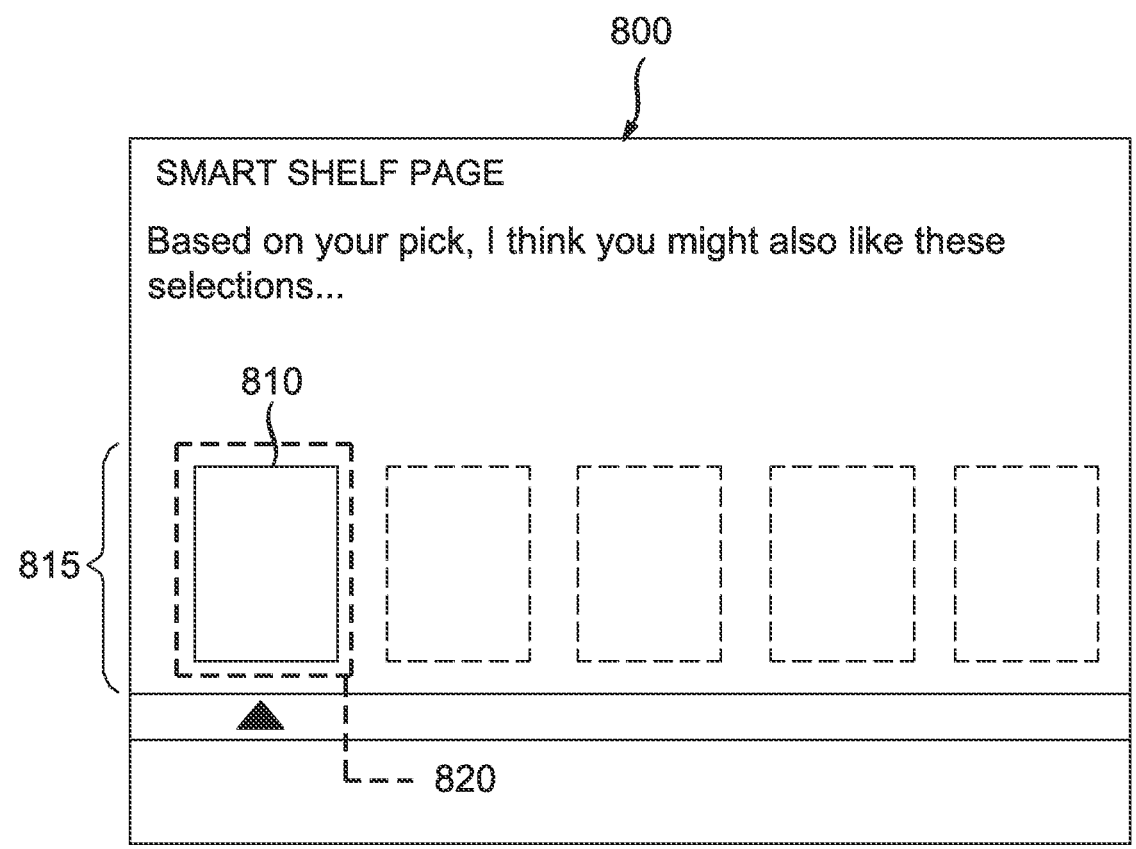
FIG. 8 illustrates an exemplary embodiment of a user interface of the present disclosure.

Referring now to FIG. 8, once the "move to smart shelf" button is selected, a smart shelf page 800 will be displayed to the user. The media asset 810 is displayed in the first position 820 of an area 815 where the media recommendations will be made. In the present disclosure the area 815 is a shelf-like area. The present disclosure uses a shelf representation since a shelf is useful way to organize media assets such as, but not limited to, movies, records, e-books and the like. It should be noted that the media asset 810 will have a distinguishing feature (e.g., color, brightness, shading, etc.) that indicates that the provided recommendations are based on the media asset 810.

Figure 9:
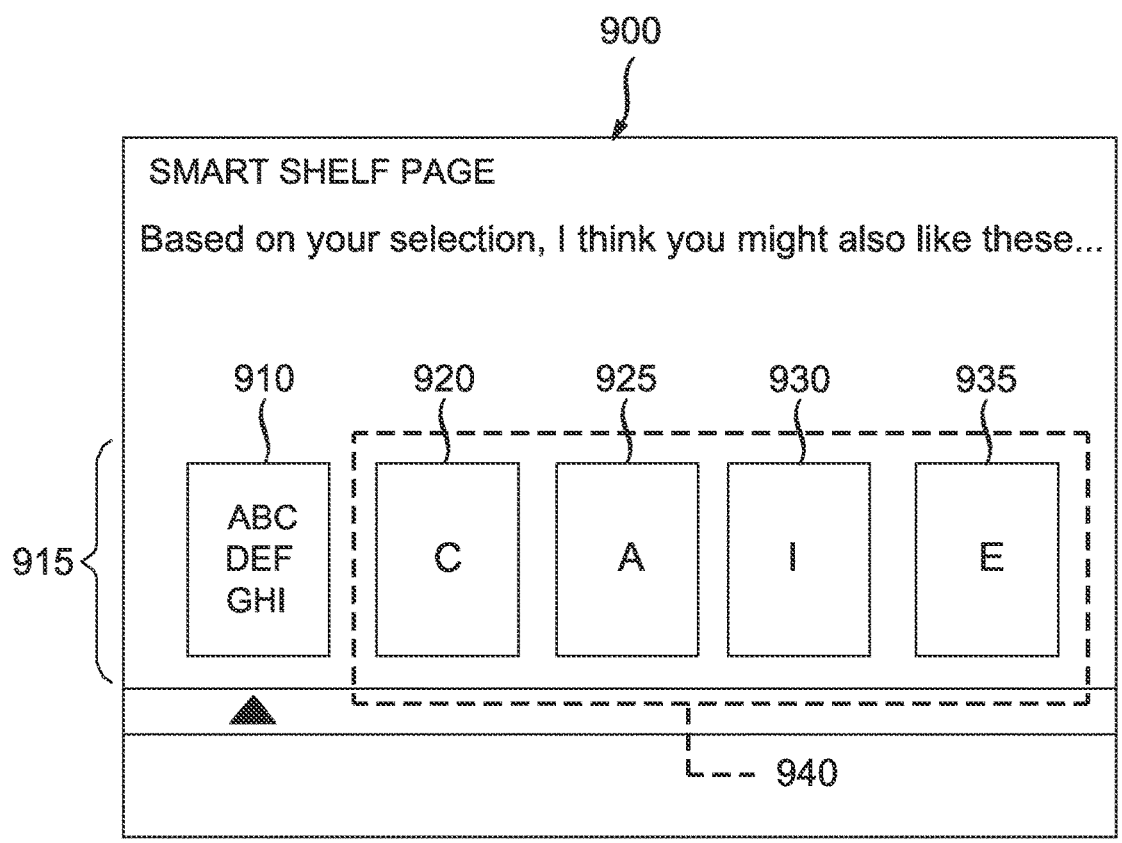
FIG. 9 illustrates an exemplary embodiment of a user interface of the present disclosure.

Referring now to FIG. 9, after the media asset 910 appears in the first position of shelf 915 on smart shelf page 900, media assets 920-935 are displayed or auto-populated in the remaining positions 940 of shelf 915. The displayed media assets 920-935 are selected to be auto-populated or displayed based on having at least one criterion, aspect, characteristic or metadata A-I in common with media asset 910. Examples of criteria, aspects, characteristics, or metadata (hereinafter criteria or characteristics) may be, but are not limited to, genre, rating, actor, director, year, title, tone, studio, producer, screenplay authors, movie information, music information poster art and the like. Such criteria may be provided with or embedded in the media asset, locally from a storage device (e.g., in storage device 212, in memory integrated into display device 114 and/or touch screen devices 116, 300), from a received electronic program guide (EPG) or can be retrieved from remote sources such as, but not limited to, Baseline, Tribune Media Services (TMS), Internet Movie Database (IMDB), Internet Video Archive (IVA), and the like.

Figure 10:
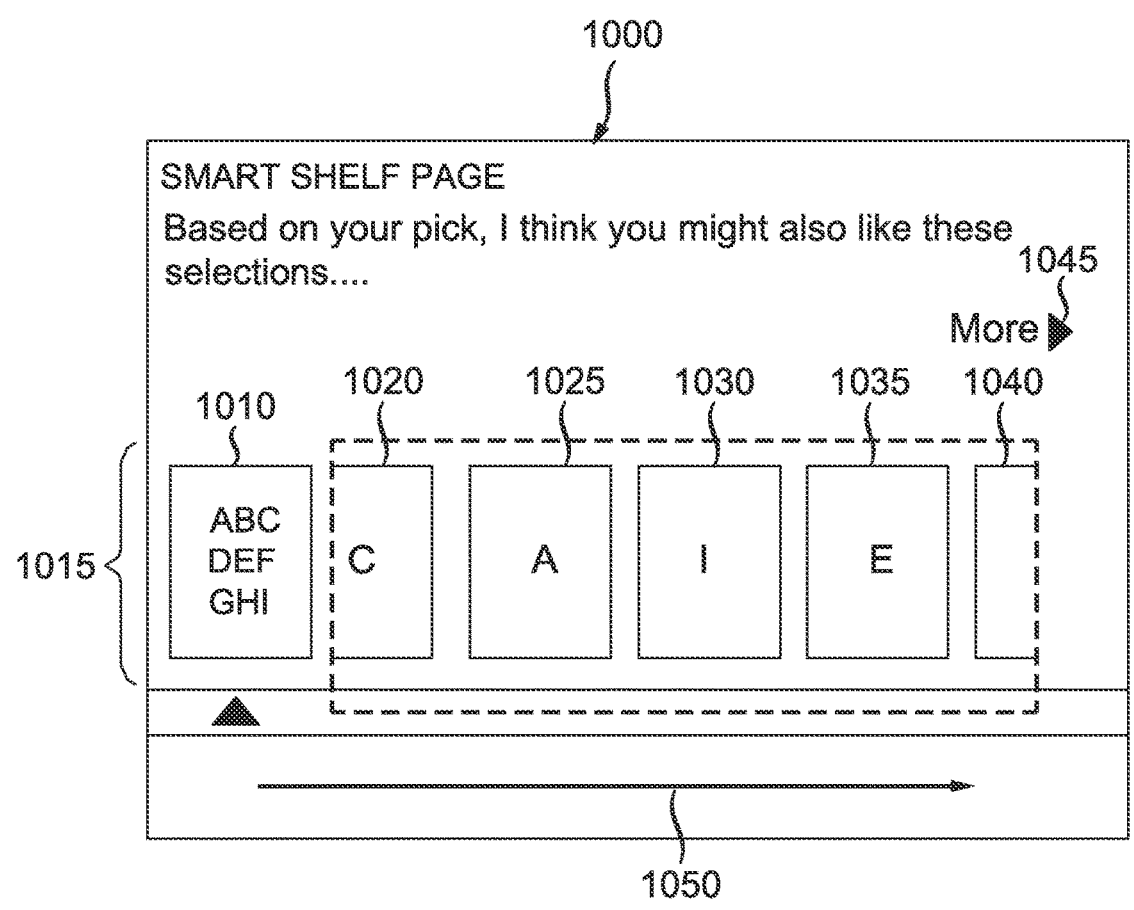
FIG. 10 illustrates an exemplary embodiment of a user interface of the present disclosure.

Referring now to FIG. 10, once the shelf 1015 becomes populated on smart shelf page 1000, the user is able to view other media assets (e.g., media asset 1040), in addition to media assets 1020-1035, sharing at least one criterion with media asset 1010. The user may scroll rightwards 1050 along the media shelf 1015 by selecting the "More" button 1045 using a mouse, keyboard or remote control. Alternatively the user may select the "More" button by making a gesture, as described above, or may even horizontally scroll or move along shelf 1015 by making a gesture alone (e.g., drag gesture, bump gesture, wag gesture, etc.) with control or media device 116, 300. It should be noted that, preferably, media asset 1010 remains stationary and displayed (i.e., frozen in place) as the other media assets are scrolled so the user has the context on which the scrolling recommended media assets are based. The more the user scrolls to the right, the more granular the criteria becomes for selecting the media asset displayed in the shelf 1015. For example, if media asset 1010 is cover-art, a thumbnail or an icon representing "500 Days Of Summer" and the criterion relating media asset 1010 to media asset 1020 was the actor Joseph Gordon-Levitt. Media asset 1020 could be the movie "Killshot". However, in the summary describing "500 Days Of Summer" there may be a description that this movie is about a man dealing with a "broken heart". As the user scrolls rightward, "broken heart" might be utilized as a criterion for media asset recommendation such that the media asset (for example, media asset 1040) recommended and displayed might be "The Break-Up". A prioritization of criteria used to create the granularity of the recommended media assets may be preselected by studios, by the service provider providing access to the media asset or by the user. One example of prioritization may be genre, title, actor, director, movie information, rating, year, tone, studio, producer, screenplay authors, music information, poster art, etc. Under this approach a media asset having common genre criterion would be positioned on shelf 1015 closer to media asset 1010 and a media asset having common music information criterion would be positioned on shelf 1015 farther from media asset 1010. Additionally, if more than one criterion is utilized in making media asset recommendations the criteria could be weighted differently. Such weighting of criteria could also be preselected by studios, by the service provider providing access to the media asset or by the user. One example of prioritization with weighting may be genre (weight=1), title (weight=1), actor (weight=1), director (weight=0.75), movie information (weight=0.75), rating (weight=0.5), tone (weight=0.5), year (weight=0.25), studio (weight=0.25), producer (weight=0.25), screenplay authors (weight=0.25), music information (weight=0.2), poster art (weight=0.1), etc. Under this approach a media asset having larger weighted criteria sum would be positioned on shelf 1015 closer to media asset 1010 and a media asset having a smaller weighted criteria sum would be positioned on shelf 1015 farther from media asset 1010.

Figure 11:
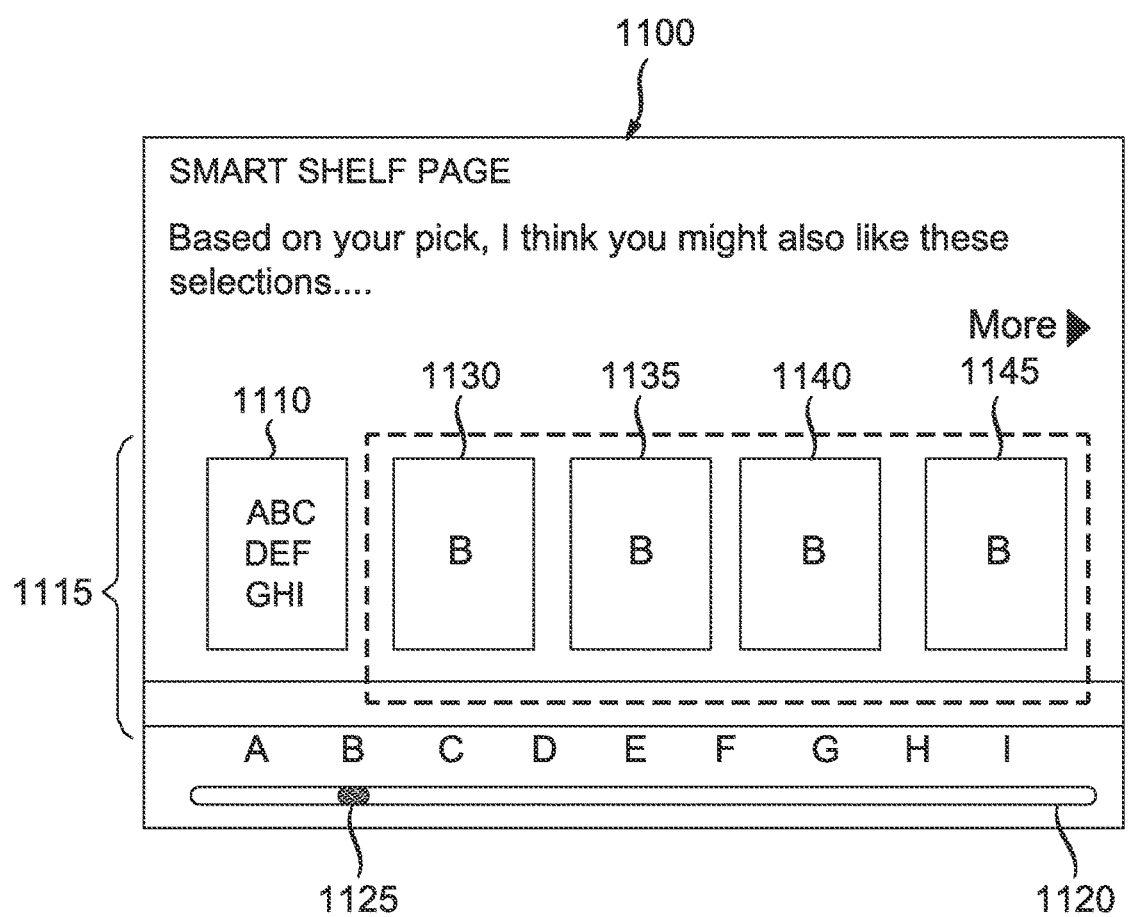
FIG. 11 illustrates an exemplary embodiment of a user interface of the present disclosure.

Referring now to FIG. 11, an additional exemplary feature of smart shelf page 1100 is shown. Using a remote control command (via a keyboard, mouse, or remote control) or using a gesture-based command, as described above, a user may cause a slider or slide bar 1120 to be displayed in the smart shelf page 1100. The slider 1120 facilitates the user's selection of one criterion from a number of displayed criteria. For example, based on a user's gesture-based command the user slides cursor 1125 along slider 1120 until criterion B is selected from criteria A-I. Criterion B may represent the director of media asset 1110. Based on the selection, the other recommended media assets 1130-1145 share the same director. The recommended media assets could be scrolled rightwards, as discussed in FIG. 12. The slider criterion feature of smart page 1110 allows the user to manipulate or filter the recommended media assets such that the user can focus on the logic behind the recommendations.

Figure 12:
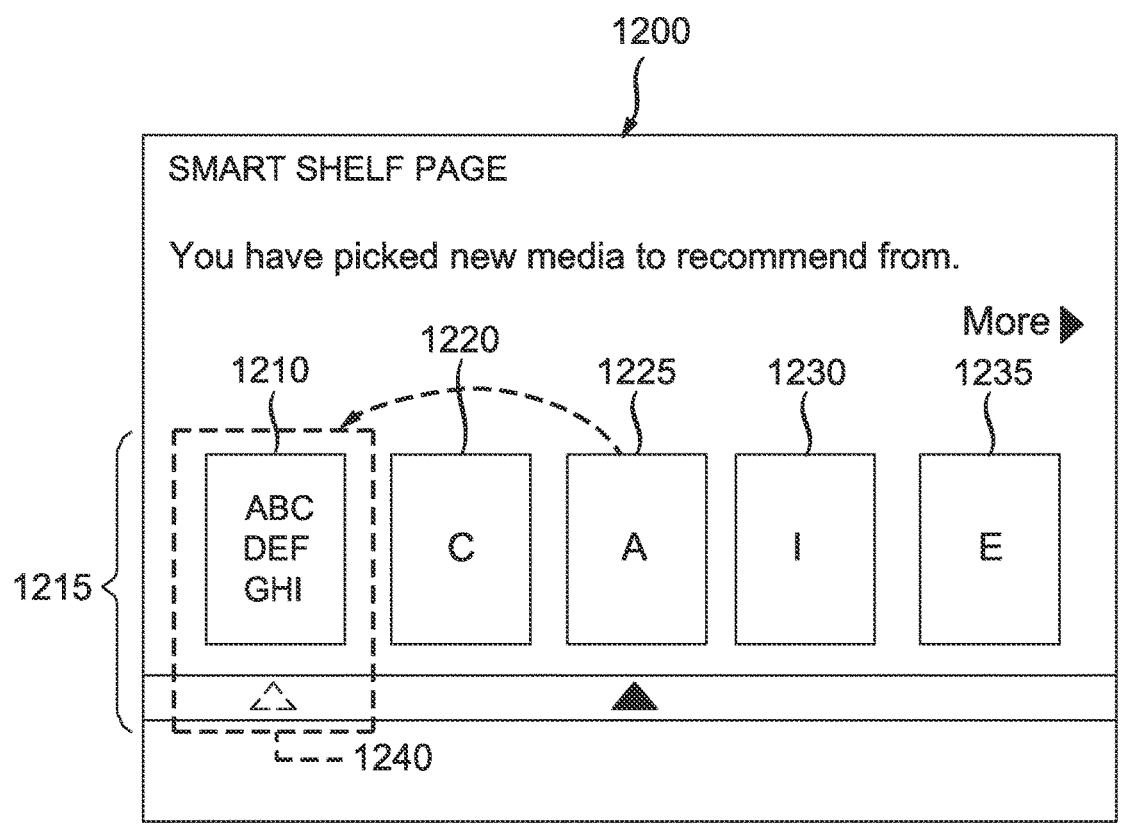
FIG. 12 illustrates an exemplary embodiment of a user interface of the present disclosure.

Referring now to FIG. 12, an additional exemplary feature of smart shelf page 1200 is shown. The user can shift the focus of the recommended media assets by selecting one of the recommended media assets 1220-1235 (e.g., media asset 1225) and replacing originally selected media asset 1210 such that the selected recommended media asset 1225 is moved to the first position 1240 of the shelf 1215. Media asset 1225 may be selected and moved using mouse, keyboard or remote control commands or using gesture commands, as described above. Once the selected media asset 1225 is in the first position 1240 of shelf 1215, a new set of media assets would be recommended with each recommended media asset having at least one criterion in common with media asset 1225. As should be appreciated, the user may then navigate through the recommended media assets associated with media asset 1225, as described above with respect to originally selected media asset. This process can be repeated until the user finds a media asset that the user would like to consume (e.g., view, download, play, rent, buy, etc.).

Figure 13:
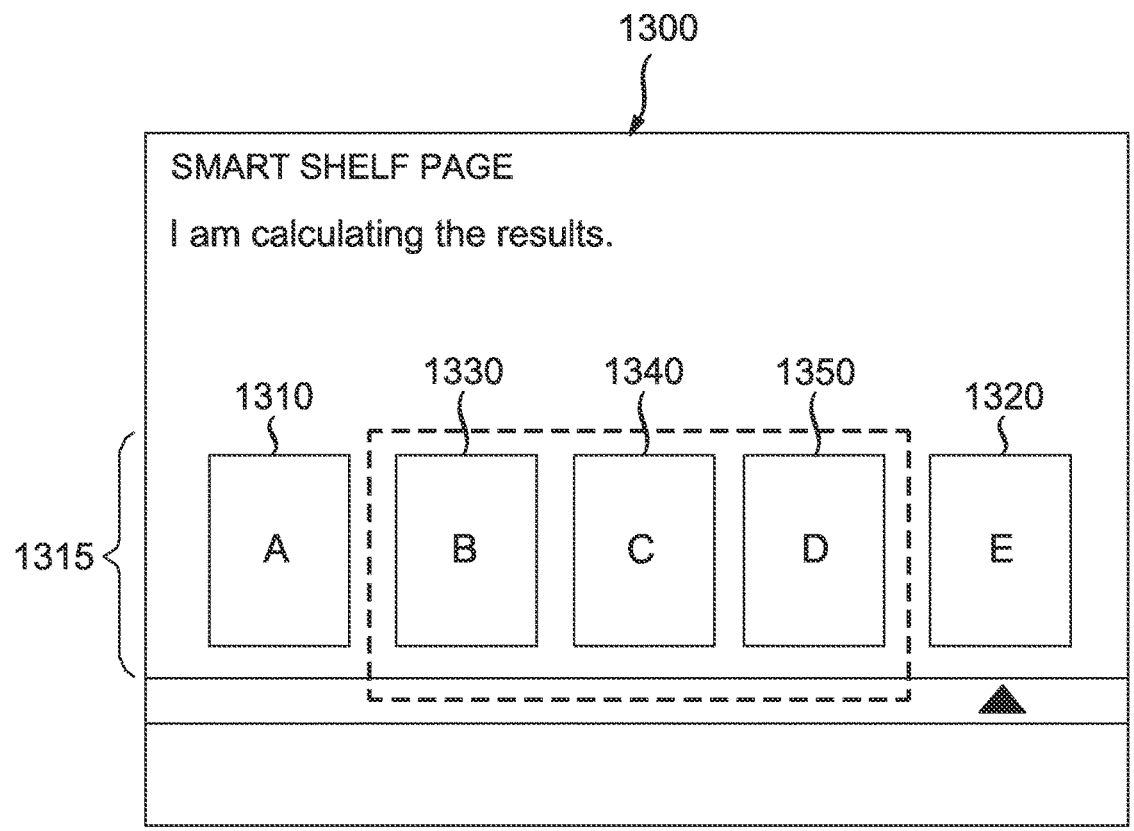
FIG. 13 illustrates an exemplary embodiment of a user interface of the present disclosure.

Referring now to FIG. 13, an additional exemplary feature of smart shelf page 1300 is shown. After the user has selected a first media asset 1310 (as described in FIGS. 6-8), the user can select a second media asset 1320 from the displayed recommend media assets (or, alternatively, in a manner similar to that described in FIGS. 6 and 7) and place, or have the second media asset 1320 automatically positioned, at the other displayed end of the shelf 1315. The recommendation engine (e.g., recommendation engine 118 or a local recommendation engine integrated within receiving device 108, display device 114, or touch screen devices 116, 300) may then display recommended media assets 1330-1350 based on criteria that is common or shared between the first media asset 1310 and the second media asset 1320. In this manner the user can select two media assets 1310, 1320 that the user knows he or she likes and can receive recommendations based on criteria shared or common between the two media assets 1310, 1320. This avoids the time consuming process of creating a database based on user ratings or viewing/purchasing habits. Using one approach, going from left to right on shelf 1315, the criteria in common between selected media asset 1310 and recommended media asset 1330 would be greater than the criteria in common between selected media asset 1310 and recommended media asset 1340 and the criteria in common between selected media asset 1310 and recommended media asset 1340 would be greater than the criteria in common between selected media asset 1310 and recommended media asset 1350. Conversely, going from right to left on shelf 1315, the criteria in common between selected media asset 1320 and recommended media asset 1350 would be greater than the criteria in common between selected media asset 1320 and recommended media asset 1340 and the criteria in common between selected media asset 1320 and recommended media asset 1340 would be greater than the criteria in common between selected media asset 1310 and recommended media asset 1330. As a result, recommend media asset 1340 would share or have in common the most criteria with both selected media assets 1310, 1320. Using another approach, the recommendation engine may merely plot between the two selected media assets such that media asset 1330 would have at least one criteria in common with selected media asset 1310 and at least one criteria in common with recommended media asset 1340 (perhaps different than the at least one criteria common between selected media asset 1310 and recommended media asset 1330), recommended media asset 1340 would have at least one criteria in common with media asset 1350 (again perhaps different than the at least one criteria common between recommended media asset 1330 and recommended media asset 1340), and recommended media asset 1350 would have at least one criteria in common with selected media asset 1320 (again perhaps different than the at least one criteria common between recommended media asset 1340 and recommended media asset 1350). Furthermore, the criteria used to provide the recommended media assets may be prioritized based on settings a studio, service provider, or the user, as discussed in further detail above. Moreover, weighted criteria may also be used, as discussed above.

Figure 14:
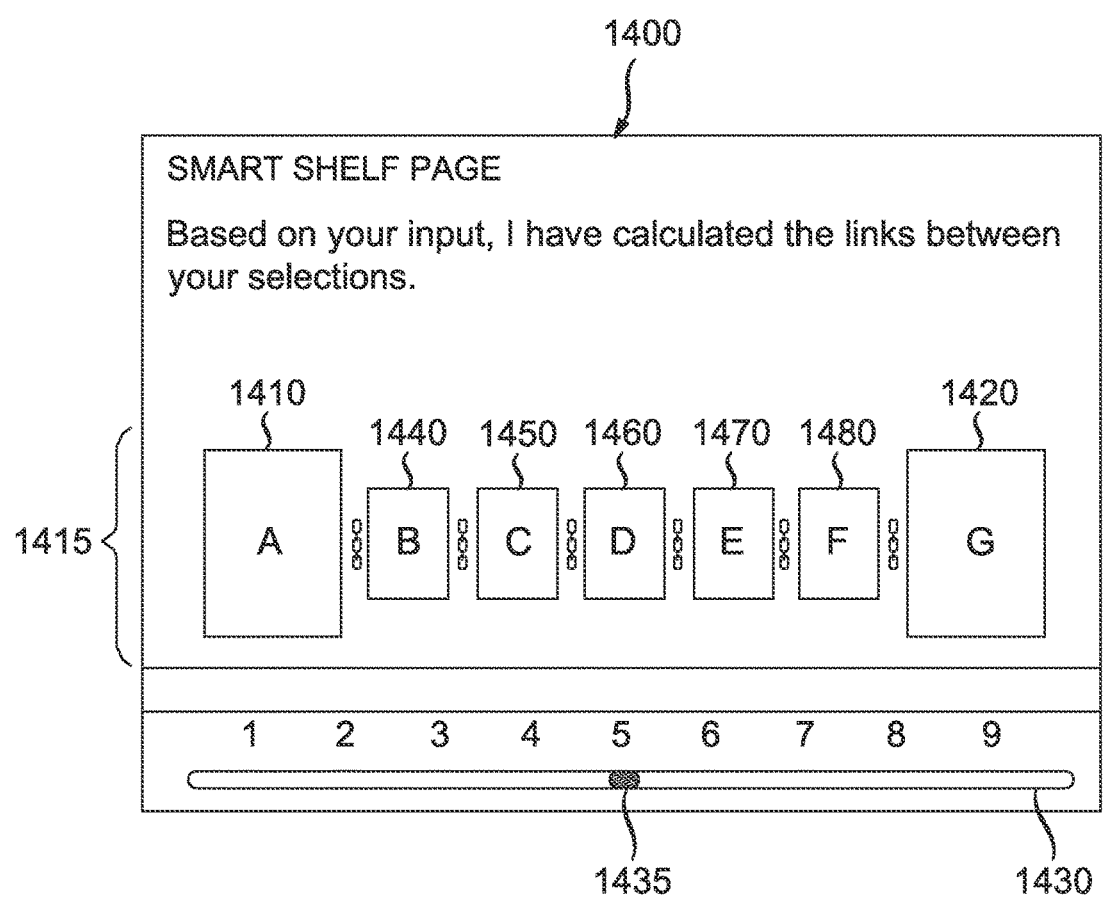
FIG. 14 illustrates an exemplary embodiment of a user interface of the present disclosure.

Referring now to FIG. 14, an additional exemplary feature of smart shelf page 1400 is shown. Once the selected media assets 1410, 1420 have been placed in the shelf 1415, the user may activate (e.g. using a remote control command (via a keyboard, mouse, or remote control) or using a gesture-based command, as described above) a slider or slide bar 1430 and cursor 1435. The slider or slide bar 1430 and cursor 1435 may be operated in a manner similar to slider or slide bar 1120 and cursor 1125 (see FIG. 11). Using slider 1430 and cursor 1435, the user may change the logic used to generate the recommended media assets. For example the user may change the number of recommended media assets displayed between selected media assets 1410 and 1420. In FIG. 13, three recommended media assets 1330-1350 were provided. Using the slider 1430 and cursor 1435 arrangement, in FIG. 14, five recommended media assets 1440-1480 are selected for display. In another example, not shown, the user may use the slider 1430 and cursor 1435 arrangement to adjust the number of shared criteria required between the selected media assets 1410, 1420 and recommended media assets.

Figure 15:
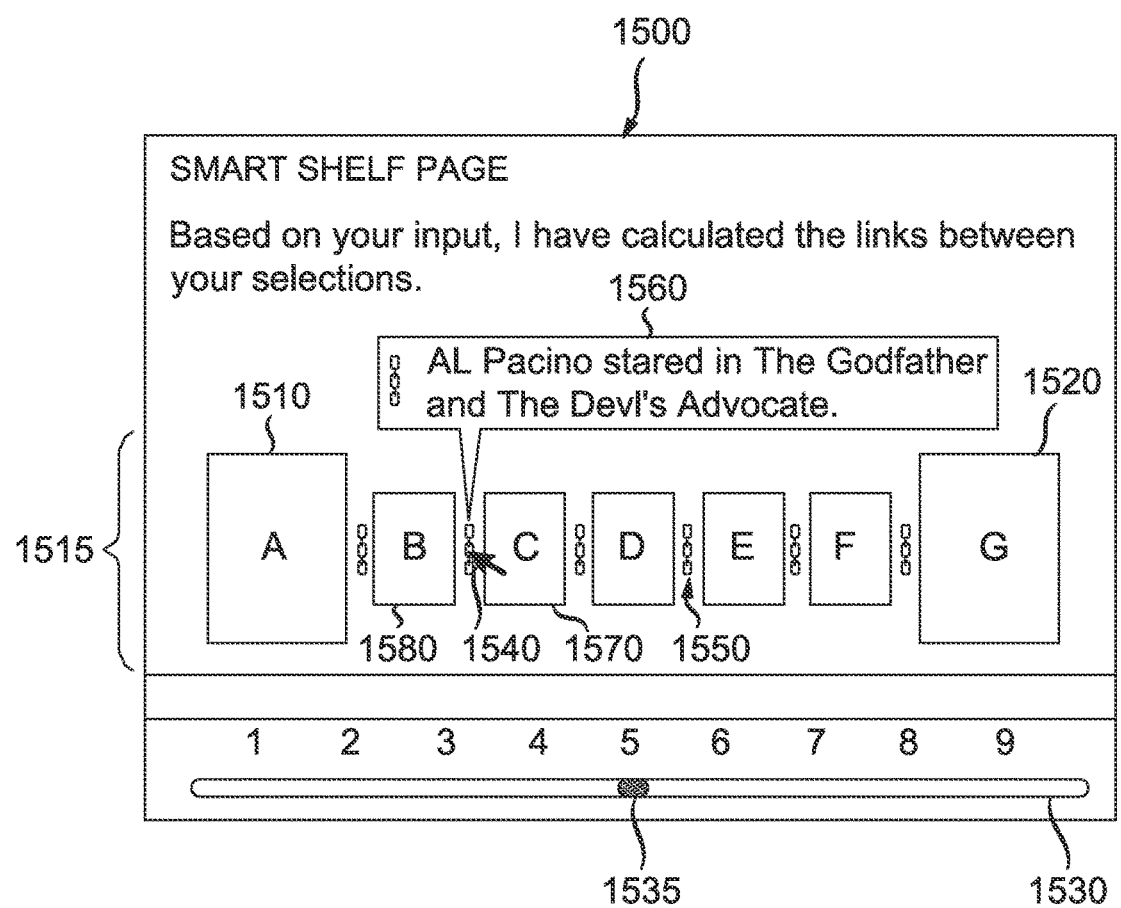
FIG. 15 illustrates an exemplary embodiment of a user interface of the present disclosure.

Referring now to FIG. 15, another additional exemplary feature of smart shelf page 1500 is shown. Once a user has selected the number of recommended media assets to display between selected media assets 1510, 1520 on shelf 1515 using the slider 1530 and cursor 1535 arrangement. The user can move a cursor 1540 over one of the link icons 1550 between adjacent media assets (e.g., 1570 and 1580) to activate a window, note, pop-up window, tooltip popup, or the like, 1560 that informs the user how the adjacent media assets 1570, 1580 are related (i.e., what criteria do the adjacent media assets have in common). For example, as shown in FIG. 15, actor Al Pacino starred in media asset 1580 ("The Godfather") and in media asset 1570 ("The Devil's Advocate"). The cursor 1540 can be moved using a remote control command (via a keyboard, mouse, or remote control) or using a gesture-based command, as discussed above.

Figure 16:
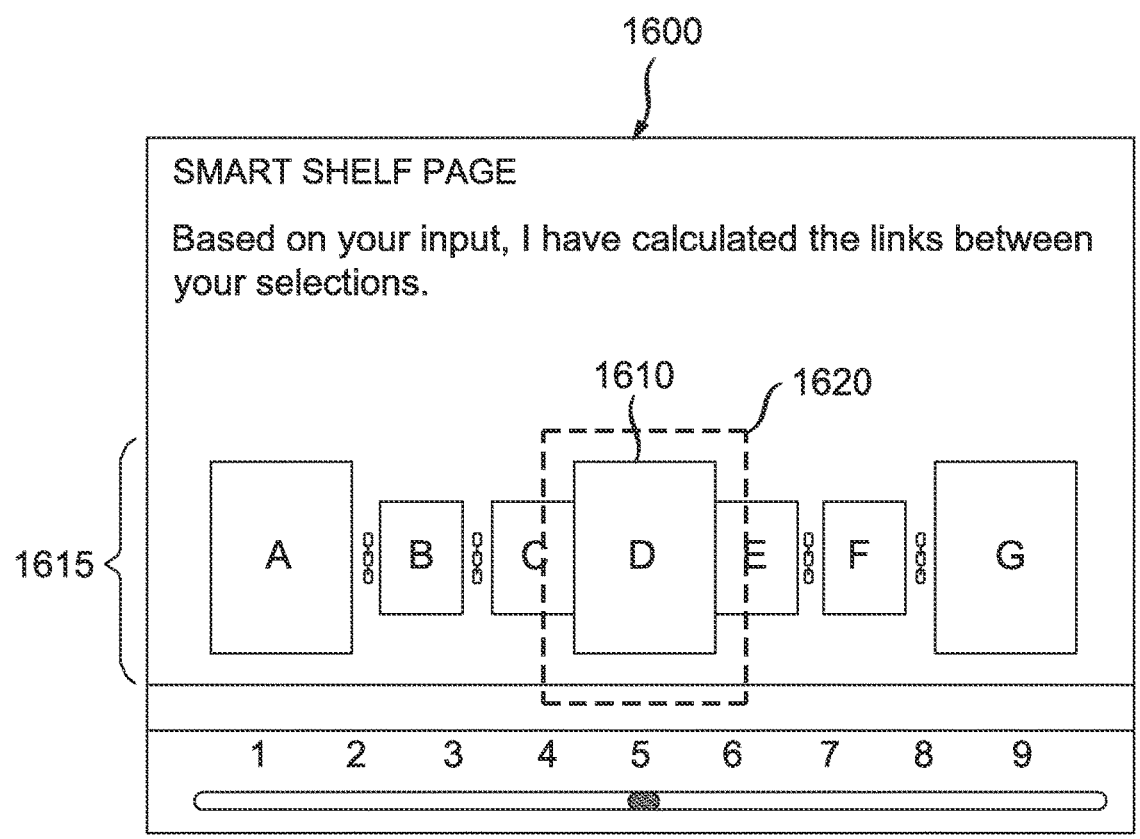
FIG. 16 illustrates an exemplary embodiment of a user interface of the present disclosure.

Referring now to FIG. 16, when a user finds a recommended media asset in the smart shelf page 1600 that the user wants to consume, e.g., recommended media asset 1610 in shelf 1615, the user can highlight or select 1620 the media asset (in a manner as discussed above) and be provided further details on how to play purchase, download, view, record or schedule the recording of the selected media asset 1610.

Figure 17:
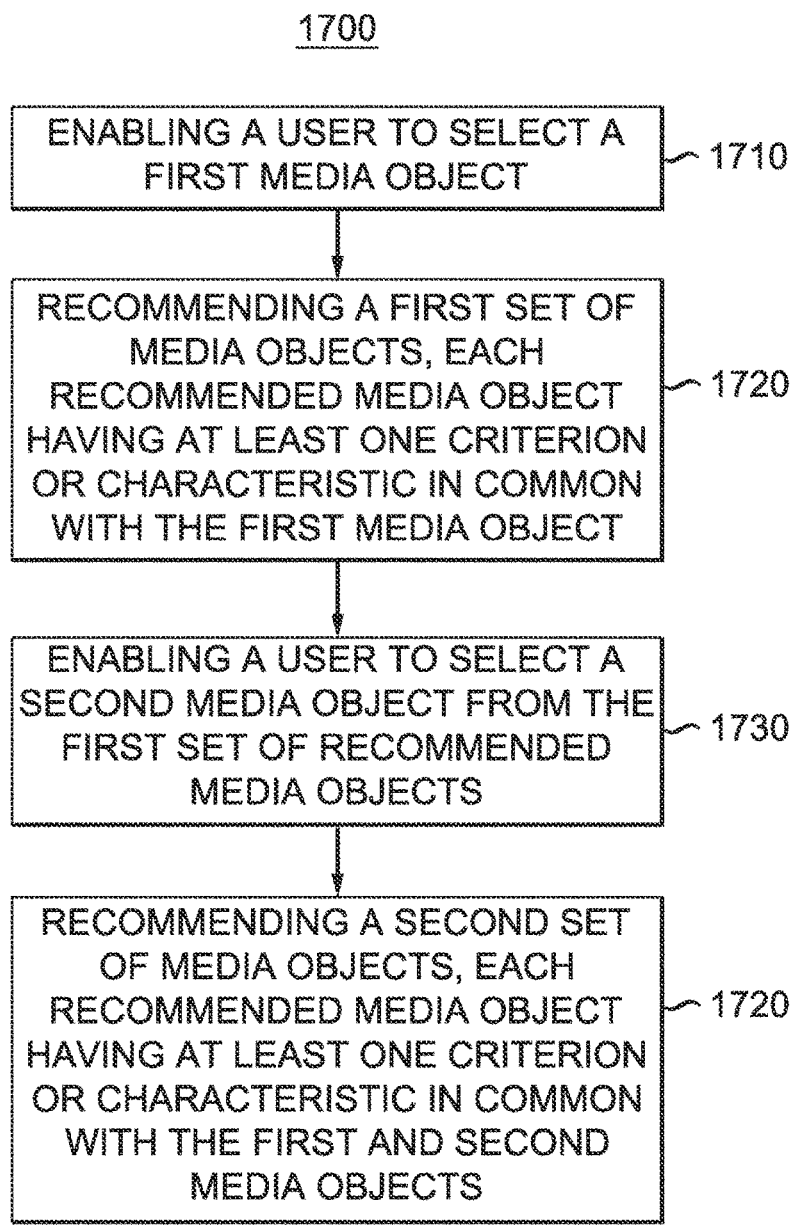
FIG. 17 is an exemplary flowchart of the present disclosure.

Referring now to FIG. 17, an exemplary flow chart 1700, more succinctly illustrating the process of the present disclosure previously set forth above, is shown. Initially, at step 1710, a user is enabled to select a first media object or asset. Next, at step 1720, a first set of media objects or assets are recommended to the user. Each recommended media object or asset having at least one criterion or characteristic in common with the first media object or asset. Afterwards, at step 1730, the user is enabled to select a second media object or asset from the first set of recommended media object or assets. Finally, at step 1740, a second set of media objects or assets is recommended to the user. Each object or asset in the second set of recommended media objects or assets has at least one criterion or characteristic in common with the first and second selected media objects.

Figure 18:
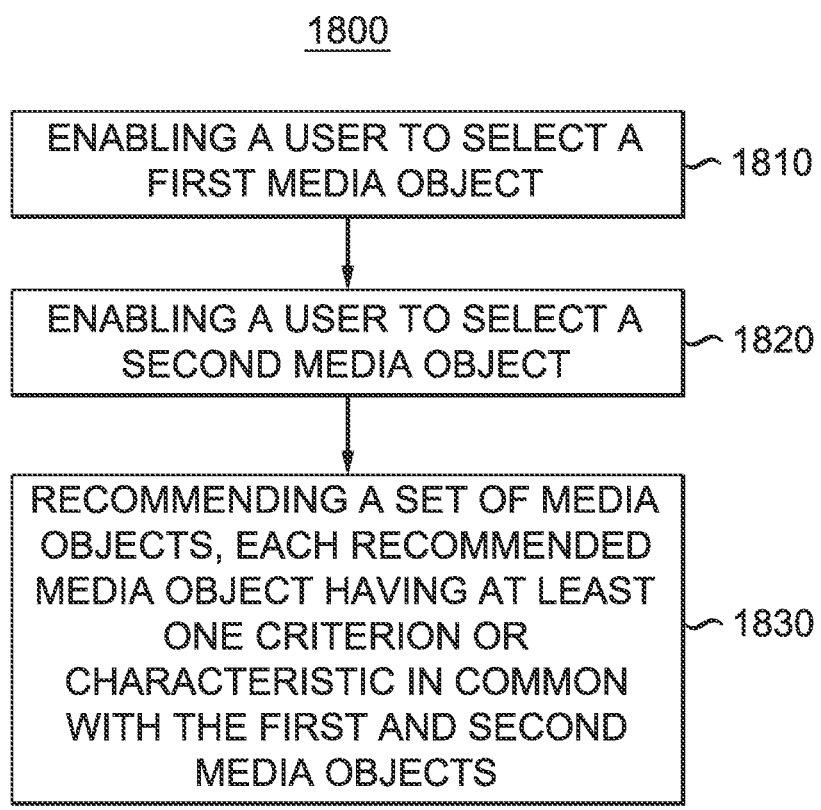
FIG. 18 is another exemplary flowchart of the present disclosure.

Referring now to FIG. 18, another exemplary flow chart 1800, more succinctly illustrating an alternative process of the present disclosure previously set forth above, is shown. Initially, at step 1810, a user is enabled to select a first media object or asset. Next, at step 1820, the user is enabled to select a second media object or asset. Finally, at step 1830, a set of media objects or assets is recommended to the user. Each object or asset in the set of recommended media objects or assets has at least one criterion or characteristic in common with the first and second selected media objects.

Although embodiments which incorporate the teachings of the present disclosure have been shown and described in detail herein, those skilled in the art can readily devise many other varied embodiments that still incorporate these teachings. Having described preferred embodiments of a system, method and user interface for content search (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

The invention claimed is:

1. A method for providing media recommendations, the method comprising:
    enabling a user to select a first media object, the first media object having a first set of characteristics;
    enabling the user to select a second media object, the second media object having a second set of characteristics;
    recommending a plurality of additional media objects, each of the plurality of recommended additional media objects having at least one characteristic in common with the first set of characteristics and at least one characteristic in common with the second set of characteristics;
    outputting for display the plurality of recommended additional media objects horizontally on a shelf, wherein the plurality of recommended additional media objects output for display are positioned on the shelf between the first selected media object and the second selected media object, and the number of the plurality of recommended additional media objects output for display is selected by a user, and wherein the outputting for display includes outputting for display a plurality of link icons, each link icon positioned between two adjacent media objects in the horizontal shelf and when selected, a window is activated providing information on which characteristics the two adjacent media objects have in common; and
    updating the plurality of recommended additional media objects that are output for display based on the number of characteristics required to be in common between the plurality of recommended additional media objects output for display and the first selected media object and the second selected media object, wherein the number of characteristics required to be in common is selected by the user using a single slider and cursor arrangement, wherein a position of the cursor on the single slider indicates the number of characteristics required to be in common.

2. The method of claim 1, wherein the user selects the number of the plurality of recommended media objects output for display using a slider and cursor arrangement.

3. The method of claim 2, wherein the user controls the slider and cursor arrangement using at least one of a mouse, a keyboard, a remote control, a touch screen media device and a gesture recognition device.

4. The method of claim 1, wherein the user controls the slider and cursor arrangement using at least one of a mouse, a keyboard, a remote control, a touch screen media device and a gesture recognition device.

5. The method of claim 1, wherein the types of characteristics required to be in common between the plurality of recommended additional media objects output for display and the first selected media object and the second media object includes at least two of genre, title, actor, director, movie information, rating, year, tone, studio, producer, screenplay authors, music information, and poster art.

6. The method of claim 5, wherein the types of characteristics required to be in common are prioritized by at least one of a studio, a service provider and the user.

7. The method of claim 5, wherein the types of characteristics required to be in common are weighted by at least one of a studio, a service provider and the user.

8. A system for providing media recommendations, the system comprising:
   means for enabling a user to select a first media object, the first media object having a first set of characteristics;
   means for enabling a user to select a second media object, the second media object having a second set of characteristics;
   means for recommending a plurality of additional media objects, each of the plurality of recommended additional media objects having at least one characteristic in common with the first set of characteristics and at least one characteristic in common with the second set of characteristics;
   means for outputting for display the plurality of recommended additional media objects horizontally on a shelf, wherein the plurality of recommended additional media objects output for display are positioned on the shelf between the first selected media object and the second selected media object, and the number of the plurality of recommended additional media objects output for display is selected by a user, and wherein the means for outputting for display includes means for outputting for display a plurality of link icons, each link icon positioned between two adjacent media objects in the horizontal shelf and when selected, a window is activated providing information on which characteristic the two adjacent media objects have in common; and
   means for updating the plurality of recommended additional media objects that are output for display based on the number of characteristics required to be in common between the plurality of recommended additional media objects output for display and the first selected media object and the second selected media object, wherein the number of characteristics required to be in common is selected by the user using a single slider and cursor arrangement, wherein a position of the cursor on the single slider indicates the number of characteristics required to be in common.

9. The system of claim 8, wherein the user selects the number of the plurality of recommended media objects output for display using a slider and cursor arrangement.

10. The system of claim 9, wherein the user controls the slider and cursor arrangement using at least one of a mouse, a keyboard, a remote control, a touch screen media device and a gesture recognition device.

11. The system of claim 8, wherein the user controls the slider and cursor arrangement using at least one of a mouse, a keyboard, a remote control, a touch screen media device and a gesture recognition device.

12. The system of claim 8, wherein the types of characteristics required to be in common between the plurality of recommended additional media objects output for display and the first selected media object and the second media object includes at least two of genre, title, actor, director, movie information, rating, year, tone, studio, producer, screenplay authors, music information, and poster art.

13. The system of claim 12, wherein the types of characteristics required to be in common are prioritized by at least one of a studio, a service provider and the user.

14. The system of claim 12, wherein the types of characteristics required to be in common are weighted by at least one of a studio, a service provider and the user.

15. An apparatus for providing media recommendations, the apparatus comprising:
   a user interface that enables a user to select a first media object, the first media object having a first set of characteristics, the user interface further enabling a user to select a second media object, the second media object having a second set of characteristics, and the user interface also enables the user to select the number of a plurality of recommended additional media objects output for display;
   a controller that recommends the plurality of additional media objects, each of the plurality of recommended additional media objects having at least one characteristic in common with the first set of characteristics and at least one characteristic in common with the second set of characteristics; and
   a display interface that outputs for display the plurality of recommended additional media objects horizontally on a shelf, wherein the plurality of recommended additional media objects output for display are positioned on the shelf between the first selected media object and the second selected media object, wherein the controller updates the plurality of recommended additional media objects that are output for display based on the number of characteristics required to be in common between the plurality of recommended additional media objects output for display and the first selected media object and the second selected media object, the number of characteristics required to be in common selected by the user using a single slider and cursor arrangement, wherein a positon of the cursor on the single slider indicates the number of characteristics required to be in common, and wherein the display interface outputs for display a plurality of link icons, each link icon positioned between two adjacent media objects in the horizontal shelf and when selected, a window is activated providing information on which characteristics the two adjacent media objects have in common.

16. The apparatus of claim 15, wherein the user interface enables the user to select the number of the plurality of recommended media objects output for display using a slider and cursor arrangement.

17. The apparatus of claim 16, wherein the user interface enables the user to control the slider and cursor arrangement using at least one of a mouse, a keyboard, a remote control, a touch screen media device and a gesture recognition device.

18. The apparatus of claim 15, wherein the user interface enables the user to control the slider and cursor arrangement using at least one of a mouse, a keyboard, a remote control, a touch screen media device and a gesture recognition device.

19. The apparatus of claim 15, wherein the types of characteristics required to be in common between the plurality of recommended additional media objects output for display and the first selected media object and the second media object includes at least two of genre, title, actor, director, movie information, rating, year, tone, studio, producer, screenplay authors, music information, and poster art.

20. The apparatus of claim 19, wherein the types of characteristics required to be in common are prioritized by at least one of a studio, a service provider and the user.

21. The apparatus of claim 19, wherein the types of characteristics required to be in common are weighted by at least one of a studio, a service provider and the user.

* * * * *